Jan. 3, 1961     J. O. EAMES     2,966,966
BRAKE MECHANISM
Filed May 9, 1956     3 Sheets-Sheet 1

INVENTOR
JAMES O. EAMES
BY Scrivener & Parker
ATTORNEYS

United States Patent Office 2,966,966
Patented Jan. 3, 1961

2,966,966
BRAKE MECHANISM

James O. Eames, Washington, Conn., assignor to Roy S. Sanford, Woodbury, Roger H. Casler and James O. Eames, Washington, and Wilfred A. Eaton and Erling D. Sedergren, Woodbury, Conn.

Filed May 9, 1956, Ser. No. 583,728

10 Claims. (Cl. 188—264)

This invention relates to fluid pressure frictional mechanism, and more particularly to fluid pressure brake mechanism of the type wherein a cooling liquid is circulated through the brake actuator, and the pressure of the cooling liquid serves to effect engagement of the friction elements of the brake mechanism.

One of the objects of the invention is to provide, in a mechanism of the above type, means for controlling the flow of cooling and brake actuating liquid through the brake actuator.

Another object of the invention is to provide means for insuring that all of the cooling liquid flowing through the brake actuator is effective to cool the friction elements thereof.

A further object of the invention is the provision of means for directing the flow of cooling liquid through a predetermined path in the brake actuator.

These and other objects and features of the invention will be more fully understood when considered in the light of the following description and the accompanying drawings. It is to be specifically understood, however, that the drawings are utilized for the purpose of illustration only, reference being had to the appended claims for a definition of the limits of the invention.

In the drawings, wherein similar reference characters denote similar parts throughout the several views.

Figure 1:
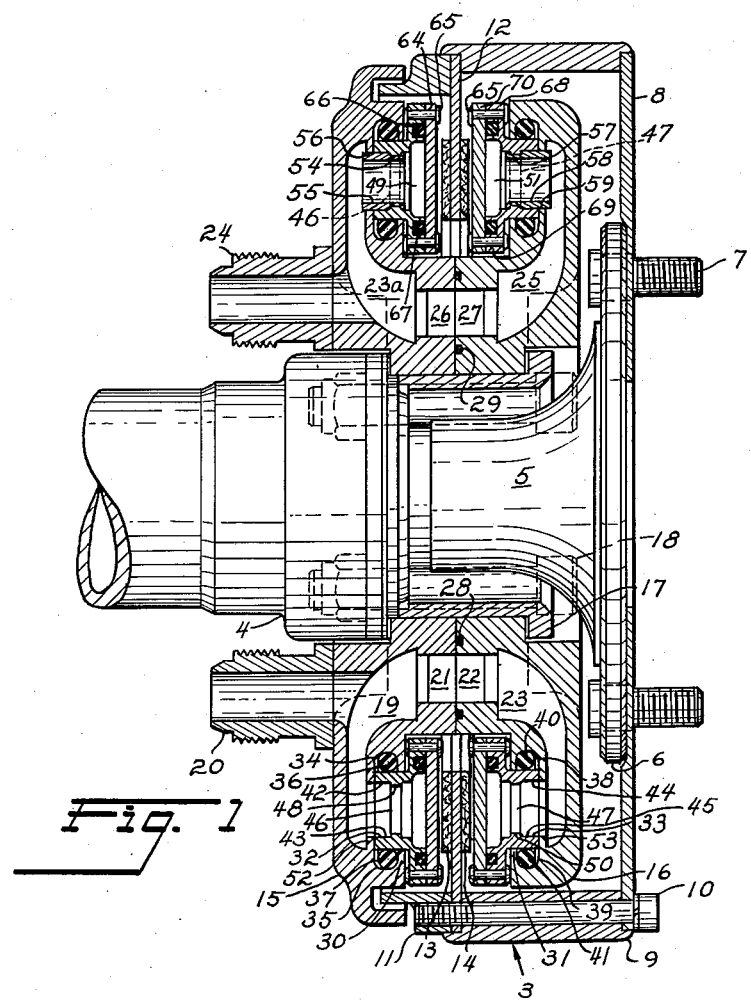
Fig. 1 shows a sectional view of the brake mechanism.

Referring first to Fig. 1, a brake actuator 3 is shown as applied to the rear axle of a vehicle which includes an axle housing portion 4, and a hub 5 mounted on an axle, not shown, the latter being rotatably mounted in the axle housing. A wheel supporting flange 6 is secured to the hub in any suitable manner, and is provided with studs 7 adapted to receive a demountable wheel, not shown. A plate 8 is secured to the hub by means of the studs 7, and a rotatable brake housing 9 is secured to the plate 8 by means of cap screws 10. An additional rotatable annular member 11 is secured to the housing 9 by means of the cap screws 10, and serves to clamp a rotatable brake lining plate 12 therebetween, the latter being provided with annular friction lining discs 13 and 14 secured thereto adhesively or otherwise, and preferably being made of a composition brake lining material having low heat conductivity. Thus, when the hub is rotating with the wheel of the vehicle, the lining plate 12 and the annular brake lining discs 13 and 14 are rotated therewith.

A pair of stationary annular rigid brake actuator members 15 and 16 are secured to the axle housing 4 by means of a clamping member 17 and cap screws 18 as shown. Member 15 is provided with an inlet passage 19 adapted to be supplied with a cooling liquid under pressure through a connection 20, this passage having a port 21 adapted to register with a port 22 connected with an intake passage 23 in the member 16. Referring to the upper part of Fig. 1, an outlet passage 23a is provided in the member 15 adapted to discharge liquid from the actuator through an outlet connection 24, the outlet passage 23a being connected with an outlet passage 25 in member 16 through a port 26 in member 15 and a port 27 in the member 16. Annular resilient sealing rings 28 and 29 serve respectively to prevent leakage at the junction of the ports 21 and 22 on the lower side of the brake, and the ports 26 and 27 on the upper side of the brake.

An annular cylinder 30 is formed in the member 15, and a similar annular cylinder 31 is formed in member 16. An annular rigid piston 32 is slidably mounted in the cylinder 30, and a similar annular rigid piston 33 is slidably mounted in the cylinder 31. Annular sealing ring grooves 34 and 35 are provided in the walls of cylinder 30, and these grooves are provided respectively with sealing rings 36 and 37 of the "O" ring type, these rings being made of rubber or other resilient material. In like manner, the walls of cylinder 31 are provided with sealing ring grooves 38 and 39, and these grooves are provided with similar sealing rings 40 and 41. The sealing rings are compressed between the piston walls and the bottoms of the corresponding grooves, and serve to automatically retract the pistons and release the brake on release of fluid pressure from the actuator. Annular pressure chambers 41a are thus formed between each piston and cylinder.

Figure 4:
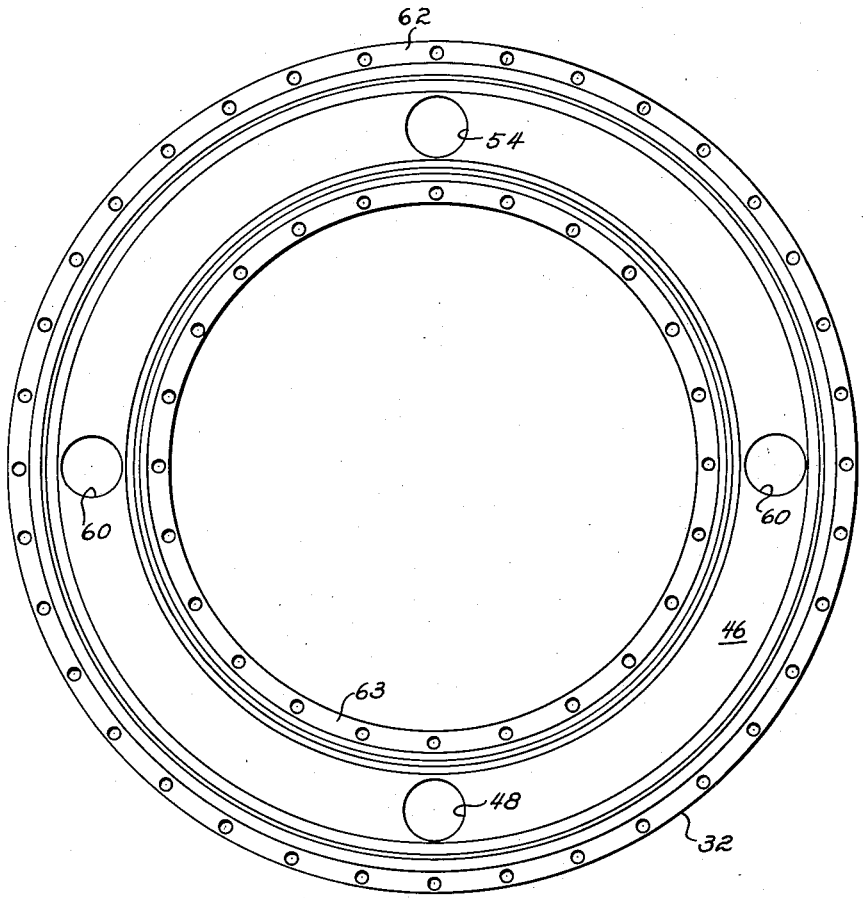
Fig. 4 is an end view of one of the pistons for the brake mechanism.

Each of the pistons 32 and 33 are provided respectively with inner and outer annular ring portions 42 and 43 and 44 and 45, and since it is desirable that the pistons be rigid, the annular ring portions are connected by annular back walls or partitions 46 and 47 respectively, see Fig. 4, forming the outer walls of the pressure chambers. Referring to the lower part of Fig. 1 of the drawing, the annular partition or back wall 46 is provided with an inlet port 48, which communicates with an annular channel 49 formed in the right end of the piston. In like manner, referring to the right side of the drawing in the lower portion, a port 50 is provided in the back wall 47 of piston 33 to permit the entrance of cooling liquid into an annular channel 51 in the piston. Ports 52 and 53 in the members 15 and 16 serve to connect the passages 19 and 23a respectively with the cylinders 30 and 31.

Referring to the upper part of Fig. 1, the back wall 46 in the piston 32 is provided with a bore 54 having a liquid flow directing device or tubular dam 55 secured therein by swedging or by other suitable means, the left end of the tubular dam being slidable in a bore 56 in the end wall of cylinder 30, and opening into the outlet passage 23a connected with the outlet fitting 24. The right end of the dam connects with the channel 49 in the piston. In like manner, the piston 33 is provided with a bore 57 having a tubular dam 58 secured therein in the same manner as the dam 55, the dam being slidably mounted in a bore 59 in the end wall of cylinder 31 and connecting the outlet passage 25 with the channel 51 of the piston 33. Thus the inner wall of the tubular dam is subjected to the action of the liquid in the channel and the outer wall is subjected to the action of the liquid in the pressure chamber. Referring to Fig. 4, showing the piston 32, which may be of identical construction with the piston 33, it will be noted that the only openings in the back wall 46 are the ports or bores 48 and 54 previously referred to, and bores 60 which are engaged and closed by anchor pins, shown in Fig. 2 and to be described in detail hereinafter.

The right end of piston 32 is provided with outer and inner flanged portions 62 and 63, and a thin annular metal friction plate 64, preferably of a metal such as copper having high heat conductivity, is secured to said flanged portions in sealing engagement therewith as by means of rivets 65. Various means may be utilized for insuring sealing engagement between the metal friction plate and the end of the piston, but in the present instance annular sealing rings 66 and 67 are provided directly adjacent the outer and inner edges of channel 49 respectively. It should also be noted that the open end of channel 49 is of substantially the same area as and substantially in alignment with the annular composition friction ring 13, and that the area of the piston acted on by fluid pressure is substantially identical with the area of the open end of the annular piston channel 49. Thus when the piston is subjected to fluid pressure to effect engagement of friction plate 64 with the friction ring 13, the force exerted to the right on the piston by the action of the fluid is substantially identical with the force exerted by the friction ring 13 in the opposite direction on the unsupported portion of element 64, and there is therefore no tendency to distort the unsupported portion of the metallic element 64 which is subjected on one side to the force of the friction ring 13, and on the other side directly to the pressure of the cooling liquid circulated through the brake actuator and channel 49 in the piston. The right hand piston 33 is also provided with outer and inner flanged portions 68 and 69 and a metallic friction element 70 secured thereto by rivets 65, the construction of the right hand piston and friction element thus being identical with that of the left hand piston, and the area relationships just referred to being the same.

Figure 2:
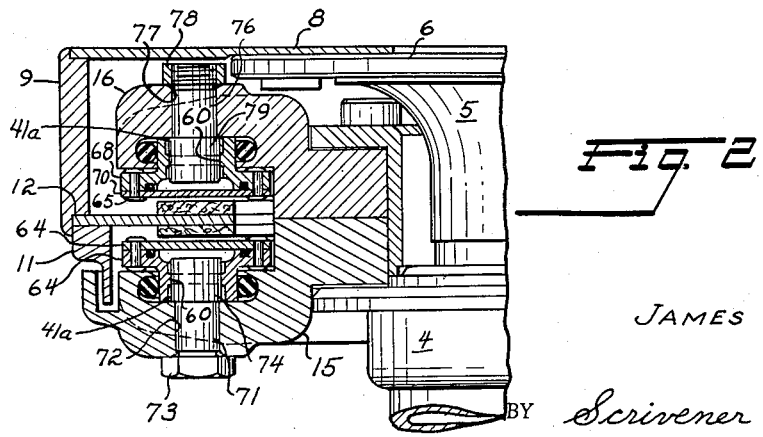
Fig. 2 is a partial view in section of the brake mechanism taken at 90° from the view shown in Fig. 1, and showing the anchors for taking the braking torque.

Referring now to Figs. 2 and 4 more particularly, and assuming that Fig. 4 shows a view of the left hand piston 30 taken from the right, it will be noted that an anchor pin 71 is secured to the member 15 in a bore 72 by means of a nut 73, an enlarged portion 74 of the pin being positioned to slidably engage the bore 60 in the back wall 46 of the piston and preferably spaced approximately 90° around the piston from the ports or bores 48 and 59. A corresponding bore 60 is formed in the piston back wall spaced from the first mentioned bore 180°, and slidably engages another anchor pin 71 in the same manner as shown in Fig. 2. Similar anchor pins 76 are provided in member 16, being secured in bores 77 by means of nuts 78 and having enlarged portions 79 adapted to slidably engage bores 60 in the piston 33, it being again noted that piston 33 is of identical construction with piston 32 but is mounted in opposed relation thereto as shown in Fig. 1. The anchor pins, being secured to the members 15 and 16, which in turn are secured to the axle housing 4, and being in sliding engagement with the bores 60 in the pistons, serve to prevent passage of cooling liquid through bores 60 and to prevent rotation of the pistons in their cylinders during engagement of the metallic friction elements 64 and 70 with the composition friction rings 13 and 14, and consequently serve to transmit the braking torque to the axle housing of the vehicle. In the preferred form of the invention, the fitting 20 serves to supply cooling and actuating liquid to the brake mechanism, while the fitting 24 serves to discharge the liquid therefrom.

Figure 3:
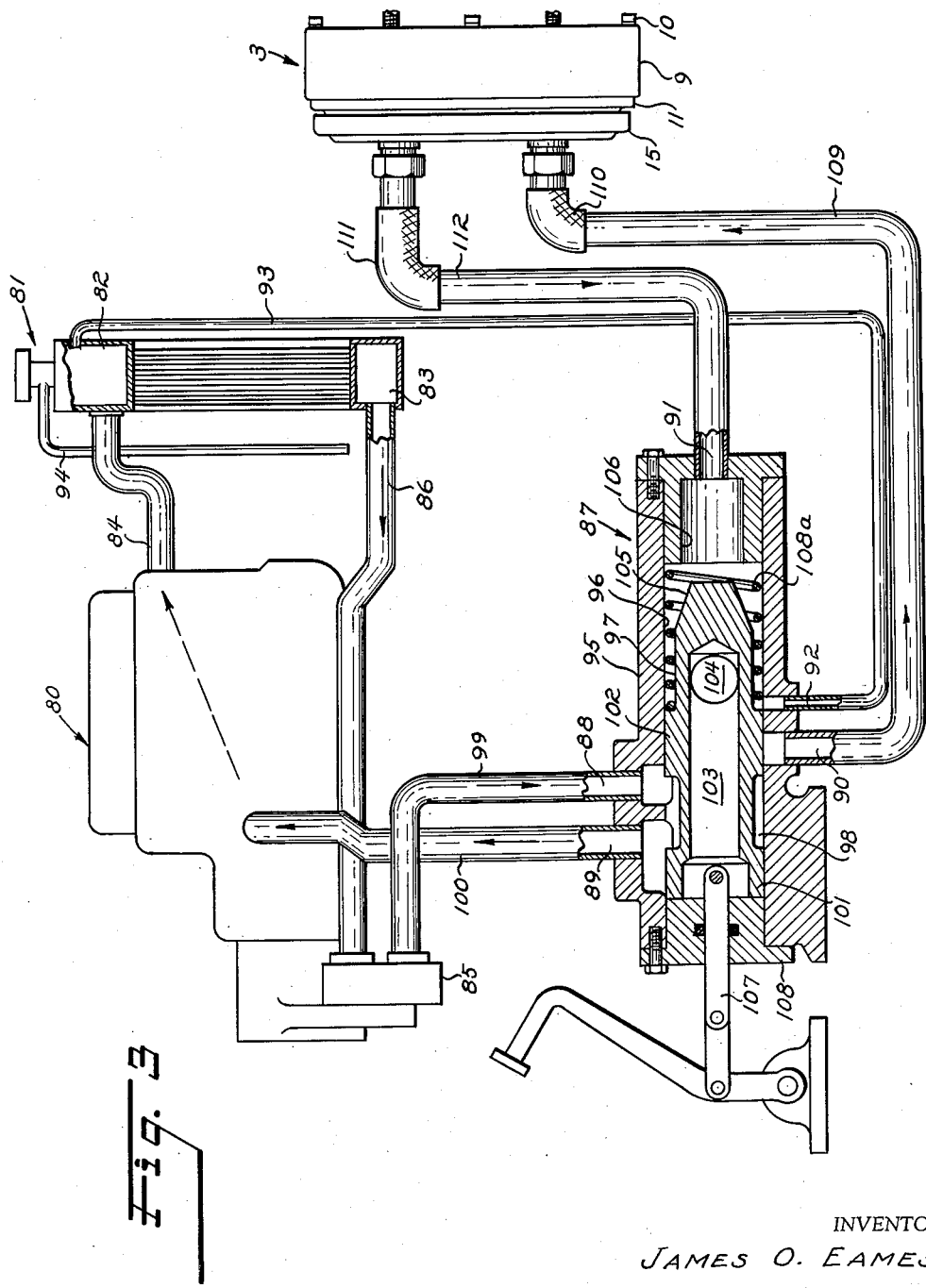
Fig. 3 is a diagrammatic view, partially in section of a form of control mechanism for operating and controlling a brake of the type shown in Fig. 1.

Fig. 3 shows a system for supplying cooling liquid under pressure to the brake, and for controlling the flow and pressure of said liquid. This control system includes an engine 80 provided with a cooling radiator 81 having upper and lower tanks 82 and 83, the upper tank being connected to the water jacket of engine 80 by means of a conduit 84, and the lower tank being connected to an engine driven pump 85, preferably of the positive displacement type, by means of a conduit 86. A control valve mechanism 87 is provided having an inlet port 88, an outlet port 89, a brake supply port 90, a brake return port 91, and a bleed port 92, the latter port being connected to the upper tank of the radiator by means of a conduit 93, and the upper tank of the radiator being vented to atmosphere by a conduit 94. The valve mechanism is provided with a housing 95 provided with a bore 96 and a spool valve 97 slidably mounted therein.

The spool valve is provided with an annular groove 98, so positioned as to normally connect ports 88 and 89 to permit the circulation of the cooling liquid for the engine from the bottom of the radiator through the conduit 86, the pump 85, a conduit 99, groove 98, and a return conduit 100 leading from the outlet port 89 of the valve to the lower portion of the engine cooling jacket. The valve is provided with lands 101 and 102, together with a bore 103 extending through the center of the valve, the bore being open at the left end and being connected at the right end with the valve housing bore 96 by means of a transverse port 104 in the spool valve. With the spool valve in the position shown, the land 101 prevents a communication between the bore 103 and the valve outlet port 89, and the land 102 prevents communication between channel 98 and brake supply port 90, while permitting communication between valve body bore 96 and the vent port 92. The right end of the valve is provided with a tapered valve 105, adapted on movement of the valve to the right to enter and restrict the flow of liquid through a bore 106 connected with the brake return port 91. A control rod 107 is slidably mounted in a cover 108 secured to the left end of the housing, and is operable to move the spool valve to the right in the event it is desired to effect a brake application. A spring 108a normally maintains the spool valve in the position shown.

When the brakes are in release position, the engine circulating pump 85 draws cooling liquid from the bottom of the engine radiator and circulates it through the engine and back to the upper tank on the radiator through the conduit 99, the groove 98 in the valve, the conduit 100, the engine water jacket, and the conduit 84. In the event it is desired to apply the brakes, the control element 107 is moved to the right, whereupon the land 101 restricts the outlet port 89 of the valve, and land 102 uncovers the brake supply port 90 to permit cooling liquid to be pumped to the brake actuator by the pump 85. Thus when the port 89 is partially closed, a portion of the cooling liquid supplied by the pump passes directly back to the engine and the vehicle radiator, and another portion passes to the brake actuator through the brake supply port 90, a conduit 109, hose 110, and fitting 20 on the brake actuator, this portion of the liquid being returned to the vehicle radiator through brake outlet fitting 24, flexible hose 111, conduit 112, brake return port 91, bore 106, valve bore 96, port 104 and bore 103 in the spool valve, brake valve outlet port 89 which is now partially uncovered by the left end of land 101 of the spool valve, conduit 100, engine 80, and the conduit 84. As the spool valve is moved further to the right, the flow of cooling liquid between conduits 99 and 100 may be entirely cut off by the valve land 101, and thereafter the entire output of the pump 85 is circulated through the brake actuator and returned to the radiator through the path just described. As the tapered valve 105 approaches the end of the bore 106, it serves to restrict the return flow of cooling liquid from the brake actuator and to increase the pressure of the liquid in the actuator in accordance with the degree of restriction. Thus, the pressure of cooling liquid in the actuator may be controlled to any desired degree in order to control the pressure with which the pistons of the actuator are moved outwardly in their cylinders to effect frictional engagement of the metallic friction elements with the rotating composition friction rings 13 and 14.

Although the above mechanism has been described as being cooled by liquid from the engine cooling system of the vehicle, it is to be understood that the circulating pump 85 may be driven by other means, and that the cooling liquid may be contained in a separate reservoir rather than in the vehicle radiator 81, if this is desired. As heretofore stated, it is preferable that the circulating pump 85 be of the positive displacement type, since with this type of pump, and disregarding the inherent slip in the pump, the amount of liquid flowing through the brake to cool the friction elements, will, with the port 90 fully open, be substantially constant for a given pump speed regardless of the degree of restriction imposed on the return of the liquid by the action of the tapered valve 105. On release of the brake valve by means of return spring 108a acting on the spool valve as shown, it will be apparent that the valve will be returned to the position shown in Fig. 3, and that the brake supply port 90 will then be disconnected from the spool valve channel 98. In the event there is any tendency with the spool valve in release position for leakage to occur into the brake supply port 90 and the conduit 109, which might tend to increase the pressure of liquid in the brake and cause the brake to drag, it will be noted that such pressure is relieved by the vent port 92 which is connected to the vented radiator 81 by means of the conduit 93. With the valve in the position shown, the outlet fitting 24 of the brake is connected to the bore 96 in the valve body through conduit 112 and bore 106, and since this is vented as just described, no appreciable pressure can build up in the brake, except that pressure which may be due to the head of liquid present above the level of the brake actuator.

As indicated heretofore, one of the primary objects of the invention is to so control the flow of the cooling liquid through the brake actuator as to obtain the full benefit of that cooling liquid in preventing overheating of the brake friction elements. Since in the present instance, and referring more particularly to the left hand piston 32 in Fig. 1, the piston back wall 46 is utilized to connect the annular ring portions 42 and 43 in order to provide a rigid piston, it is obvious that the piston channel 49, wherein the action of the cooling liquid is desired, is separated from the cylinder or pressure chamber at the left of the piston except for the connection afforded by the port 48, and is made shallow so the liquid will flow through the channel at high velocity to provide efficient cooling of the metallic friction element 64. Since the metallic friction element 64 is relatively thin and preferably made of a material such as copper, this element is not relied upon to establish a rigid connection between the inner and outer ring portions 42 and 43 of the piston, this connecting function being performed by the back wall 46. In view of this, it is desirable that all of the liquid circulation in the left side of the brake occur in the piston channel 49 directly adjacent the left hand surface of the metallic friction element 64, and that the cylinder at the left of the piston partition 46 merely be subjected to the static pressure of the circulating liquid, the same action applying to the right side of the brake. This is accomplished in the mechanism shown by means of the tubular dam 55 which is secured to the piston and is slidably mounted for movement with the piston in the bore 56 of the member 15. When the control valve 87 is operated to admit cooling liquid to the brake actuator through the fitting 20, this liquid enters the chamber 19, passes through port 52 into the cylinder behind the piston, and on into the annular piston channel 49 adjacent the left face of the friction element 64 by way of the port 48 in the piston back wall. This is the only inlet to the annular cylinder at the left side of the back wall 46, it being noted that the flow of liquid from the annular cylinder through port 54 and bores 60 is prevented respectively by dam 55 and anchor pins 71. It will also be noted in this connection, that the enlarged portions 74 on the anchor pins have sufficient clearance between their outer surfaces and the adjacent walls of the annular ring portions 42 and 43 of the piston to permit the passage of sufficient liquid to move the piston to the right against the friction ring 13. Consequently, the only flow of liquid into the cylinder itself through the port 52 is that required to move the piston from the position shown, to the right sufficiently to effect engagement between the metallic friction element 64 and friction ring 13. There is, however, no circulation in the annular cylinder because there is no outlet in the cylinder to cause such circulation to take place. The liquid which has entered the annular piston channel 49 flows upward in both directions to the uppermost point of the channel, and is discharged into the outlet chamber 23a and thence to the outlet fitting 24 through the bore of the dam 55. The flow of course can be reversed if desired, with the brake supply conduit 109 being connected to fitting 24 and the brake return conduit 112 being connected to fitting 20. In either case no liquid flows in the cylinder behind the piston except that necessary to move the piston. Following such movement of the piston, all of the flow is through the piston channels 49 and 51 directly adjacent the rear surfaces of metal friction elements 64 and 70. It will be understood that the action which occurs in the left and right hand portions of the brake is identical.

In view of the foregoing, it will be apparent that, referring again to the left hand portion of the brake we have a static pressure chamber, which is the portion of the cylinder directly to the left of the piston, and a dynamic or circulating chamber, which is the channel 49 directly to the left of the metallic friction element 64. There is only one connection between the two chambers, this being the port 48, and consequently the only liquid displaced in the static chamber on application of the brake is that necessary to move the piston to the right sufficiently to effect engagement between the metallic friction element and the composition friction ring 13. As soon as the friction elements engage, all of the liquid supplied to the brake through the inlet fitting 20 passes through the channel 49 in intimate engagement with the left hand surface of the metallic friction element 64, and is discharged from the brake through the fitting 24, the discharge from the channel 49 being through the dam 55 which is preferably spaced approximately 180° from the port 48. Consequently all of the circulating liquid is in close proximity with the left surface of the metallic friction element, with the result that extremely efficient cooling of the element is obtained. In the event that, in the embodiment shown, circulation of some of the liquid were to occur in the static chamber, this would act as a shunt circuit, and a larger pump would be required in order to obtain the same degree of cooling of the metallic friction element. The same action of course occurs on the right hand portion of the brake.

While the invention has been illustrated and described in considerable detail, it is to be understood that the same is not to be considered as limited thereby, and that other embodiments of the invention may suggest themselves to those skilled in the art. Reference will be had, therefore, to the appended claims for a definition of the limits of the invention.

What is claimed is:

1. Liquid cooled and liquid pressure operated brake mechanism including a hub rotatably mounted on a support, an annular brake disc secured to the hub for rotation therewith, an annular friction ring on the disc, a cylinder member secured to the support having an annular cylinder formed therein, an annular piston slidably mounted in the cylinder forming a pressure chamber therebetween and having an annular liquid channel therein with the open end adjacent said friction ring, said channel having a back wall separating said channel from the pressure chamber, an annular metal friction element secured along its inner and outer peripheries to the outer end of said piston and forming an outer end wall for said piston channel, said friction element being adapted to engage said friction ring on movement of the piston outwardly in said cylinder, inlet and outlet ports in said cylinder member for respectively supplying cooling liquid under pressure to said brake mechanism and for discharging said cooling liquid therefrom, a direct connection between one of said ports and the channel in said piston, and means for connecting the other of said ports to the chamber formed between said piston and cylinder member, and to the channel in said piston at a point spaced from said direct connection to said channel.

2. Liquid cooled and liquid pressure operated brake mechanism as set forth in claim 1, wherein said direct connection includes a tubular dam secured at one end to the back wall of said piston and slidably mounted adjacent the other end in a bore in a portion of said cylinder member, one end of the bore of said tubular dam communicating directly with said channel in said piston, and the other end communicating with said one port, said tubular dam being so arranged and constituted as to prevent direct communication between said one port and the chamber formed between said piston and said cylinder member.

3. Liquid cooled and liquid pressure operated brake mechanism including a hub rotatably mounted on a support, an annular friction ring secured to the hub for rotation therewith, a cylinder member and a piston member, one of said members being secured to the support and the other being slidable with respect thereto and forming a pressure chamber between the members, an annular liquid channel in said other member having an open end adjacent said annular friction ring, an annular metal friction element secured in sealing engagement to the outer end of said other member adjacent said friction ring and forming an outer end wall for said channel, inlet and outlet ports associated with said mechanism for supplying cooling liquid under pressure thereto and for discharging said liquid therefrom, and liquid flow directing means associated with said members for directing the flow of liquid from the inlet port to the outlet port through said channel in intimate engagement with the entire surface of said friction element exposed in said channel, supplying liquid under pressure to said pressure chamber, and substantially preventing the flow of liquid between said ports through said pressure chamber including spaced apart inlet and outlet ports in said other member, means for connecting the ports in said other member respectively with the first named inlet and outlet ports, and a connection between one of the first named ports and chamber.

4. Liquid cooled and liquid pressure operated brake mechanism as set forth in claim 3, wherein said liquid flow directing means includes a tubular dam member connected to one of said members and slidably mounted in a bore in the other of said members, one end of the bore of said dam being connected with said channel, and the other end being connected to one of said ports.

5. Liquid cooled and liquid pressure operated brake mechanism as set forth in claim 3, wherein said liquid flow directing means includes a dam connected to one of said members and in sliding engagement with the other of said members, said dam being so constituted as to prevent the flow of liquid through said pressure chamber from said inlet port to said outlet port.

6. Liquid cooled and liquid pressure operated brake mechanism including a hub rotatably mounted on a support, an annular brake disc secured to the hub for rotation therewith, an annular friction ring secured to each side of the brake disc, a pair of annular cylinder and piston members on each side of said brake disc, one member of each pair being secured to the support and the other member of each pair being slidable with respect to said one member and forming a pressure chamber therebetween, an open ended channel in each of said slidable members having the open end thereof adjacent to a corresponding friction ring, a metallic friction element secured to the outer end of each slidable member and forming an end wall for the corresponding channel, each friction element being adapted to engage a corresponding adjacent friction ring, inlet and outlet ports for respectively supplying cooling liquid under pressure to the mechanism and discharging said liquid therefrom, and liquid flow directing means associated with each pair of said members, said means being so constituted as to direct the flow of liquid through the channels in each of said slidable members from said inlet to said outlet port in intimate engagement with the surfaces of said friction elements exposed in said channel, to direct liquid under pressure to the pressure chamber between each pair of members, and prevent the flow of liquid through said chambers between said ports.

7. Liquid cooled and liquid pressure operated brake mechanism as set forth in claim 6, wherein the liquid flow directing means includes a liquid flow directing member secured to one member of each pair of cylinder and piston members and in sliding engagement with the other member of each pair, the flow directing member having one wall subjected to the action of the liquid in said channel and another wall subjected to the action of the liquid in the pressure chamber.

8. A liquid cooled and liquid pressure operated friction brake actuator including an annular cylinder member, an annular piston slidably mounted in the cylinder and forming a pressure chamber therebetween, an annular channel for cooling liquid in the piston having an outer wall on the piston with a friction surface on the outer end thereof and an inner wall on the piston separating said chamber from said channel, separate inlet and outlet ports in said cylinder member having connections with said channel at spaced apart points, said ports, connections and channel forming a circuit for the circulation of cooling liquid under pressure, and a connection between said circuit and pressure chamber for subjecting the latter to the pressure of liquid in said circuit, said last named connection being the sole connection between said circuit and said pressure chamber.

9. Liquid cooled and liquid pressure operated frictional mechanism including a hub rotatably mounted on a support, an annular friction ring secured to the hub for rotation therewith, a cylinder member and a piston member, one of said members being secured to the support and the other of said members being slidable with respect to said one member and forming a pressure chamber therebetween, said other member having an annular channel formed therein adjacent said friction ring, said channel being separate from said chamber, an annular metal friction element secured along its inner and outer peripheries to the outer end of said other member and forming an outer end wall for the channel therein, means for preventing relative rotation of said cylinder and piston members, means for directing cooling liquid along the entire inner surface of said element exposed in said channel including means for supplying a circulating liquid under pressure to said channel at one point and for discharging said liquid therefrom at another point, and a connection between said channel and pressure chamber for subjecting the chamber to the pressure of liquid in said channel, said liquid supplying means including inlet and outlet ports in said one member and connections between said ports and channel entering said channel in spaced relationship, and said connection between said channel and chamber including means for connecting one of said ports only with said chamber.

10. Liquid cooled and liquid pressure operated frictional mechanism including a hub rotatably mounted on a support, an annular friction ring secured to the hub for rotation therewith, a cylinder member and a piston member, one of said members being secured to the support and the other of said members being slidable with respect to said one member and forming a pressure chamber therebetween, said other member having an annular channel formed therein adjacent said friction ring, said channel being separate from said chamber, an annular metal friction element secured along its inner and outer peripheries to the outer end of said other member and forming an outer end wall for the channel therein, means for preventing relative rotation of said cylinder and piston members, means for directing a cooling liquid along the entire inner surface of said element exposed in said channel including means for supplying a circulating liquid under pressure to said channel at one point and for discharging said liquid therefrom at another point, a connection between said channel and pressure chamber for subjecting the chamber to the pressure of liquid in said channel, said liquid supplying means including inlet and outlet ports in said one member, a pair of ports spaced substantially 180° apart in said other member and connected with said channel therein, and means for connecting said inlet port with one of the ports in said other member and said outlet port with the other port in said other member.

References Cited in the file of this patent
UNITED STATES PATENTS

| | | |
|---|---|---|
| 464,949 | Alden | Dec. 15, 1891 |
| 2,174,635 | Linderman | Oct. 3, 1939 |
| 2,406,304 | Levy | Aug. 20, 1946 |
| 2,821,273 | Sanford et al. | Jan. 28, 1958 |